United States Patent
Seo et al.

(10) Patent No.: US 10,629,967 B2
(45) Date of Patent: Apr. 21, 2020

(54) BATTERY MODULE HAVING COOLING STRUCTURE

(71) Applicants: Hyundai Motor Company, Seoul (KR); Kia Motors Corporation, Seoul (KR)

(72) Inventors: Jeong Hun Seo, Gyeonggi-do (KR); Jun Seok Choi, Gyeonggi-do (KR); Yong Jin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 275 days.

(21) Appl. No.: 15/648,268

(22) Filed: Jul. 12, 2017

(65) Prior Publication Data

US 2018/0175466 A1 Jun. 21, 2018

(30) Foreign Application Priority Data

Dec. 15, 2016 (KR) .................. 10-2016-0172006

(51) Int. Cl.
| | |
|---|---|
| *H01M 10/613* | (2014.01) |
| *H01M 2/10* | (2006.01) |
| *H01M 10/625* | (2014.01) |
| *H01M 10/6557* | (2014.01) |
| *H01M 10/6551* | (2014.01) |
| *H01M 10/6556* | (2014.01) |
| *H01M 10/6555* | (2014.01) |
| *H01M 10/6554* | (2014.01) |
| *H01M 10/652* | (2014.01) |

(52) U.S. Cl.
CPC ....... *H01M 10/613* (2015.04); *H01M 2/1077* (2013.01); *H01M 10/625* (2015.04); *H01M 10/6551* (2015.04); *H01M 10/6554* (2015.04); *H01M 10/6555* (2015.04); *H01M 10/6556* (2015.04); *H01M 10/6557* (2015.04); *H01M 10/652* (2015.04); *H01M 2220/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2012/0177960 A1* | 7/2012 | Tasai | .................. | B60H 1/00278 |
| | | | | 429/72 |
| 2013/0224524 A1* | 8/2013 | Nam | .................. | H01M 2/1077 |
| | | | | 429/7 |

FOREIGN PATENT DOCUMENTS

KR 2012-0029824 A 3/2012

* cited by examiner

*Primary Examiner* — Christopher P Domone
(74) *Attorney, Agent, or Firm* — Mintz Levin Cohn Ferris Glovsky and Popeo, P.C.; Peter F. Corless (57) ABSTRACT

A battery module having a cooling structure with a minimized size while providing high cooling efficiency is provided. The battery module includes a front plate and a rear plate that are arranged at a front side and a rear side of a battery pack in which a plurality of battery cells is stacked and a heat-dissipating member that is arranged under the battery pack and absorbs heat generated by the battery pack. Additionally, side plates are arranged at lateral ends of the front plate and the rear plate, arranged to be in contact with respective lateral ends of the heat-dissipating member, and include a cooling channel through which a coolant circulates to cool the battery pack.

14 Claims, 9 Drawing Sheets

BATTERY MODULE HAVING COOLING STRUCTURE

CROSS REFERENCE TO RELATED APPLICATION

The present application claims priority to Korean Patent Application No. 10-2016-0172006, Dec. 15, 2016, the entire contents of which is incorporated herein for all purposes by this reference.

BACKGROUND

1. Field of the Invention

The present invention relates to a battery module, and more particularly, to a battery module having a cooling structure of a reduced size with high cooling efficiency.

2. Description of the Related Art

Recently, interest in eco-friendly vehicles has increased due to environmental issues and high oil prices. Thus, electric vehicles or hybrid vehicles using electric energy as an energy source have been developed. For a battery module used in electric vehicles or hybrid vehicles, pouch battery cells, structured with a battery cell enclosed in a pouch, are typically used. A plurality of pouch battery cells is stacked and the stack of pouch battery cells is accommodated within a case. The number of battery cells of a battery module varies according to the required energy capacity.

Battery cells generate heat when supplying electric energy. Therefore, it is necessary to dissipate heat generated by battery cells during operation of the battery cells. Accordingly, in a conventional battery module, for the purpose of cooling battery cells, a channel gap is formed between battery cells and a coolant circulates through the channel gap. However, this structure has a disadvantage in that an overall size of a battery module is increased.

The foregoing is intended merely to aid in the understanding of the background of the present invention, and is not intended to mean that the present invention falls within the purview of the related art that is already known to those skilled in the art.

SUMMARY

Accordingly, the present invention provides a battery module having a cooling structure of a minimized size with high cooling efficiency and thus, the battery module may be assembled in a smaller package without deteriorating cooling performance.

According to one aspect, a battery module having a cooling structure may include: a front plate and a rear plate arranged at a front side and a rear side of a battery pack in which a plurality of battery cells is stacked; a heat-dissipating member arranged under the battery pack and absorbing heat generated by the battery pack; and side plates arranged at lateral ends of the front plate and the rear plate, arranged to be in contact with respective lateral ends of the heat-dissipating member, and having a cooling channel through which a coolant circulates to thus cool the battery pack.

The battery cells of the battery pack may be stacked to face the side plates, and the front plate and the rear plate may be arranged at lateral ends of the side plates. The side plates are combined with the front plate and the rear plate such that a coupling member passes through the side plate and penetrates into the front plate in a sideways direction of the battery pack, and a second coupling member passes through the side plate and penetrates into the rear plate in the sideways direction of the battery pack.

The battery cells may be stacked to face the front plate and the rear plate, and the front plate and the rear plate may be arranged at lateral ends of the side plates. The side plates are combined with the front plate and the rear plate such that a coupling member passes through the front plate from an upper end to a lower end of the front plate and is connected to a lower end portion of the side plate at a lower end thereof and a coupling member passes through the rear plate from an upper end to a lower end of the rear plate and is connected to a lower end portion of the side plate at a lower end thereof.

A heat transfer material may be disposed between the battery pack and the heat-dissipating member. Each of the side plates may include: a side heat exchange portion arranged at the lateral ends of the front plate and the rear plate and may include a cooling channel, to thus perform heat exchange with the battery pack; and a support portion bent from a lower end portion of the side heat exchange portion and that extends to an underside of the front plate or the rear plate to be in contact with the heat-dissipating member.

Coupling portions may be formed to protrude downward from the lower ends of the front plate and the rear plate, and the coupling portions may pass through the support portions of the side plates. The cooling channel of the side plate may extend in a front-and-rear direction and include a plurality of channels arranged in a vertical direction. The channels of the cooling channel vary in size and may gradually increase in size from a lowest channel of the channels to a highest channel of the channels.

The battery module may further include an upper plate disposed on a top surface of the battery pack and between the side plates and may cover the top surface of the battery pack. The battery pack may include a first battery pack and a second battery pack stacked in a vertical direction and each of which is assembled with a front plate, a rear plate, side plates, and a heat-dissipating member in the same manner as each other, wherein a first side plate provided to the first battery pack may include a first connection portion at a lower end thereof, a second side plate provided to the second battery pack may include a second connection portion at an upper end thereof, and the first connection portion and the second connection portion may be connected to each other.

The first connection portion may include a plurality of protrusions that protrude downward from the lower end of the first side plate and disposed in a longitudinal direction of the first side plate at regular intervals. The second connection portion may include a plurality of recesses recessed from the upper end of the second side plate and disposed in a longitudinal direction of the second plate at the same intervals as the protrusions of the first connection portion, and the second connection portion may be meshed with the first connection portion. The first connection portion may include a first aperture that extends in a front-and-rear direction of the battery module, the second connection portion may include a second aperture that extends in the front-and-rear direction of the battery module, and the first side plate and the second side plate may be combined with each other by a fixing member inserted through the first aperture and the second aperture when the first connection portion and the second connection portion are meshed with each other.

The first connection portion may be a protrusion that extends in a longitudinal direction of the first side plate and protrudes from the lower end of the first side plate and which may include an engagement protrusion at an end of the protrusion. The second connection portion is a recess that is recessed in the upper end of the second side plate and that extends in a longitudinal direction of the second side plate and which includes a guide recess into which the engagement protrusion is inserted.

The battery pack may include a third battery pack and a fourth battery pack that are arranged side by side and each of which is assembled with a front plate, a rear plate, and a heat-dissipating member in the same manner as each other. A third side plate may be arranged on an outer side surface of the third battery pack, a fourth side plate may be arranged on an outer side surface of the fourth battery pack, and a center plate may be interposed between the third battery pack and the fourth battery pack.

The center plate may include: a center heat exchange portion having a center cooling channel to perform heat exchange with the third and fourth battery packs; and a center support portion that extends from a lower portion of the center heat exchange portion to be in contact with the heat-dissipating member provided to the third battery pack and with the heat-dissipating member provided to the fourth battery pack. According to the battery module having a cooling structure of the present invention, the cooling structure has a reduced size while providing high cooling efficiency. Therefore the battery module may be assembled in a more compact package without deteriorating cooling performance.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference now should be made to the drawings, in which the same reference numerals are used throughout the different drawings to designate the same or similar components. Hereinbelow, exemplary embodiments of a battery module equipped with a cooling structure will be described in detail with reference to the accompanying drawings.

Figure 1:
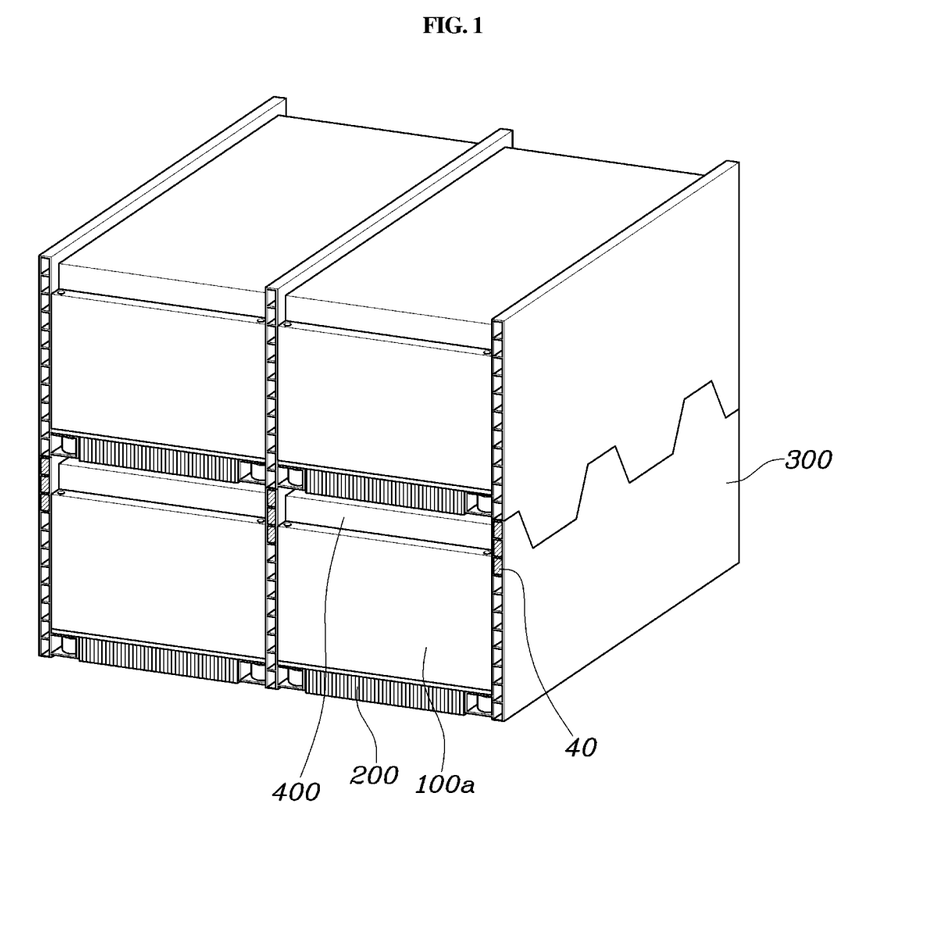
FIG. 1 is a perspective view illustrating a battery module having a cooling structure according to one exemplary embodiment of the present invention.
Figure 2:
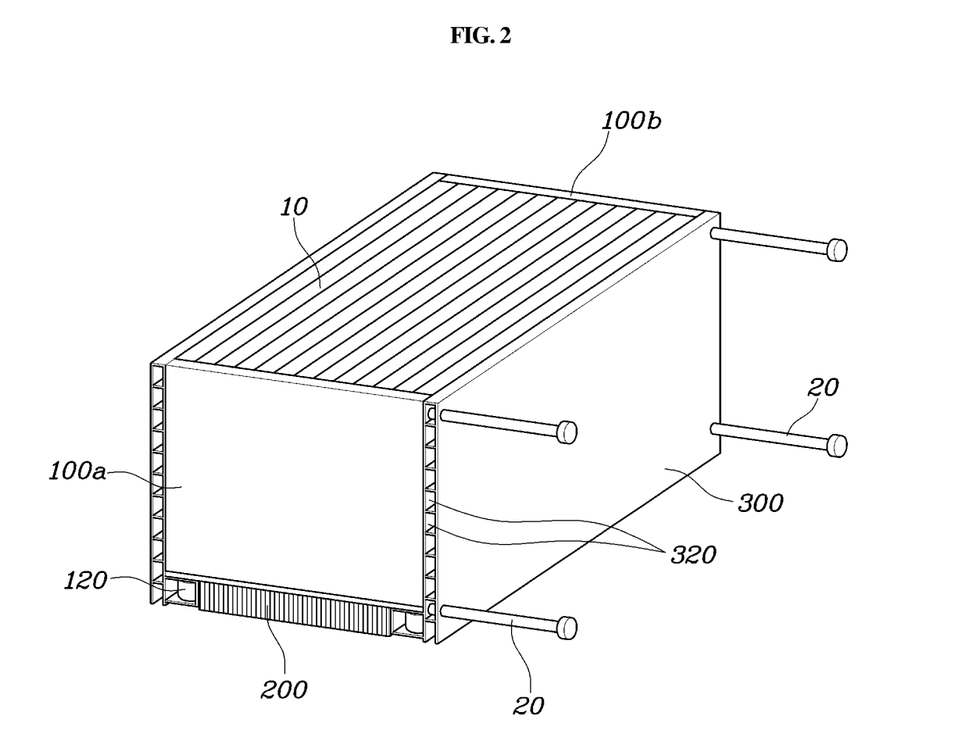
FIGS. 2 to 4 are perspective views for describing the battery module of FIG. 1 according to one exemplary embodiment of the present invention.
Figure 3:
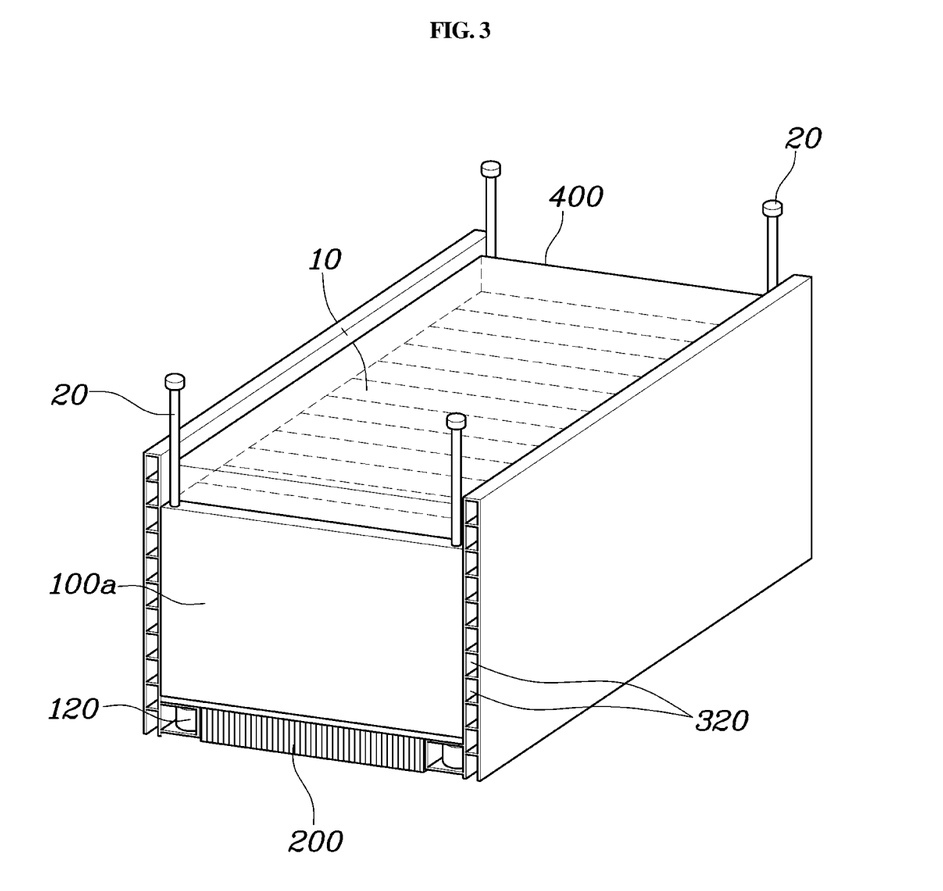
Figure 4:
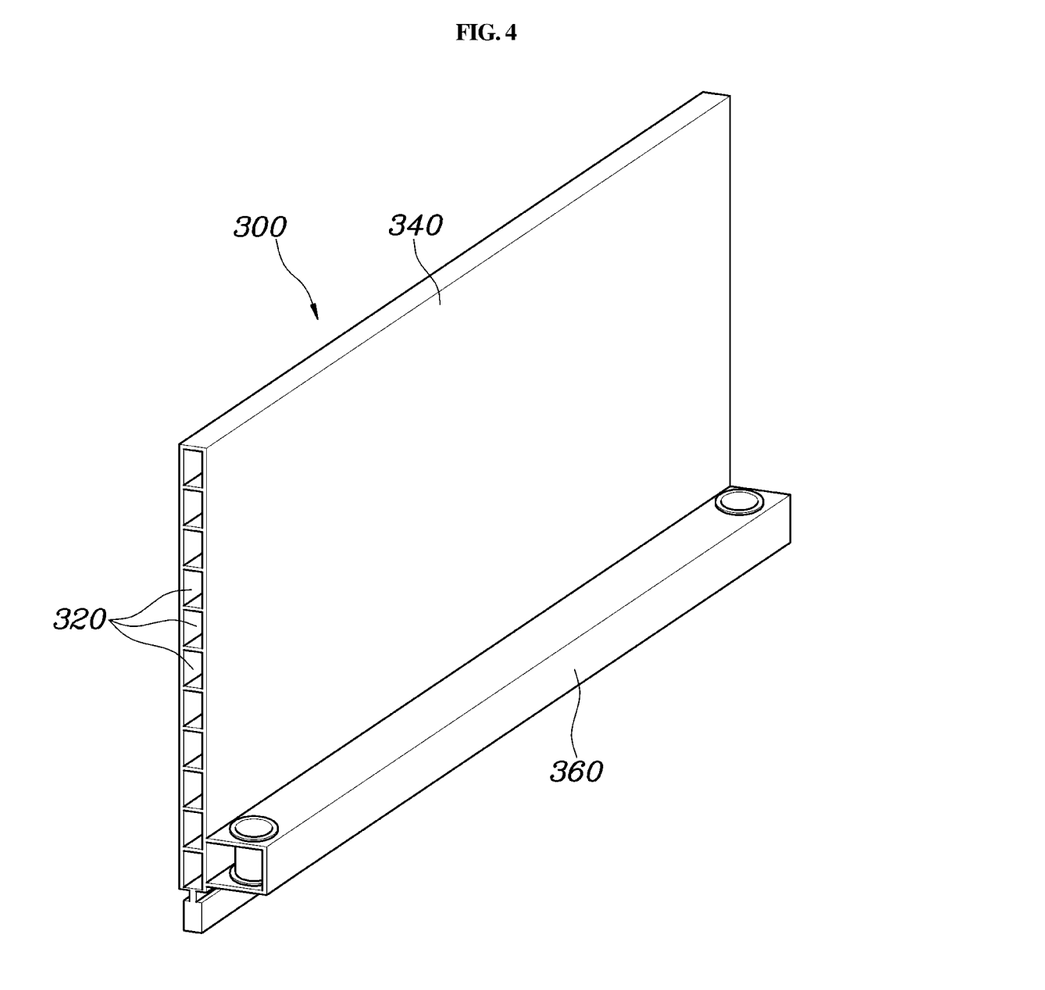
Figure 5:
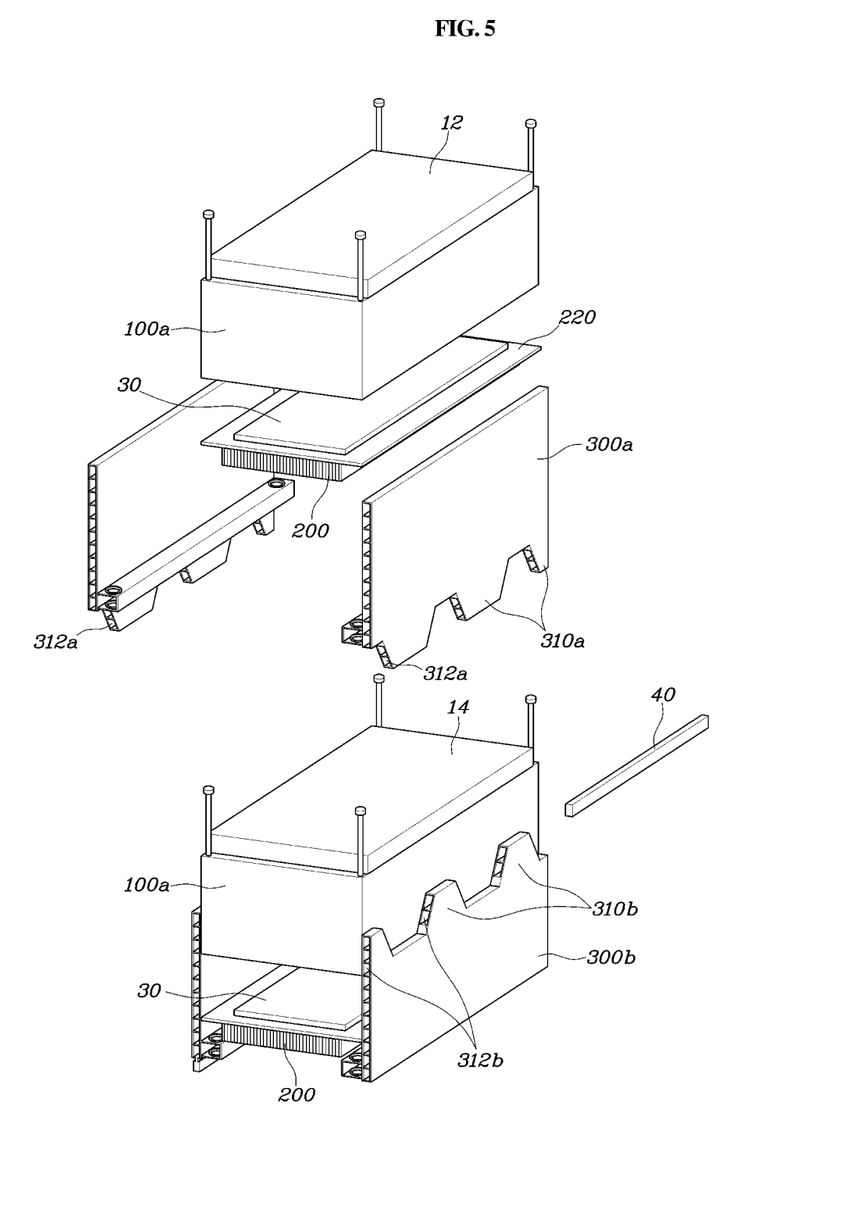
FIG. 5 is a detailed perspective view illustrating a connection structure of a battery module having a cooling structure according to a first exemplary embodiment of the present invention.
Figure 6:
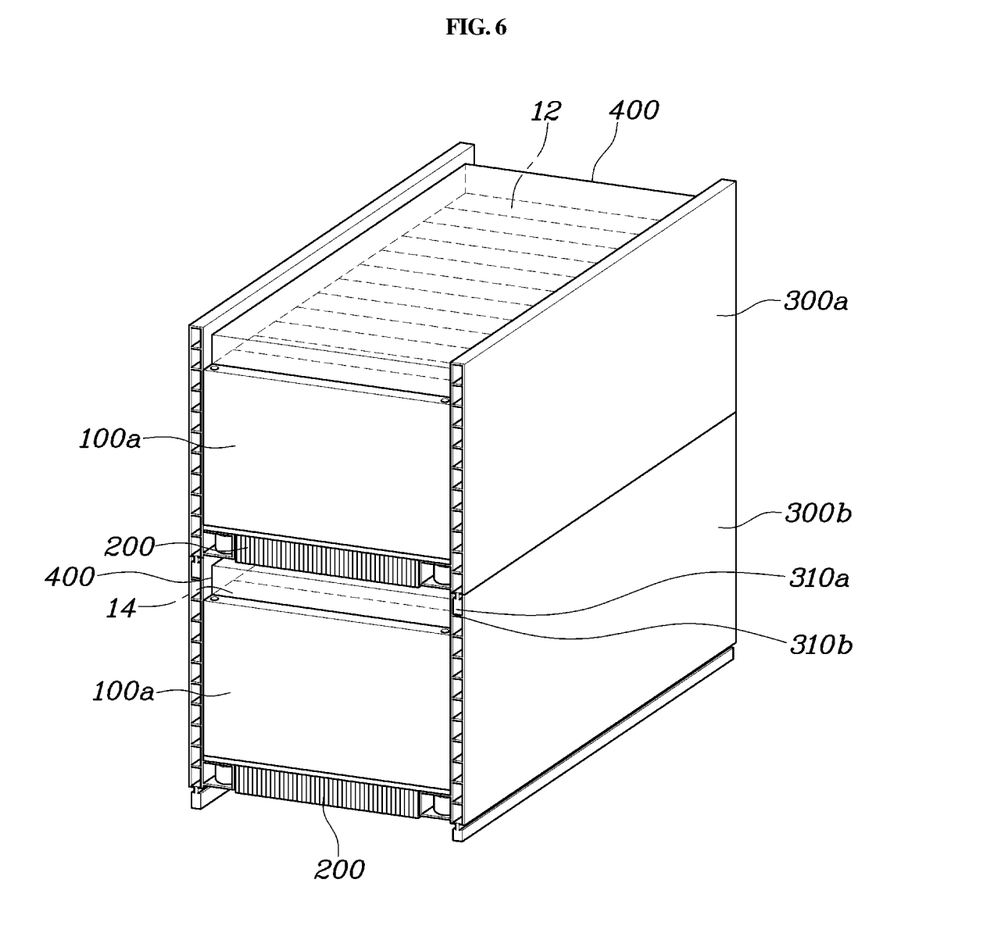
FIGS. 6 to 8 are views illustrating a connection structure of a battery module having a cooling structure according to a second exemplary embodiment of the present invention.
Figure 7:
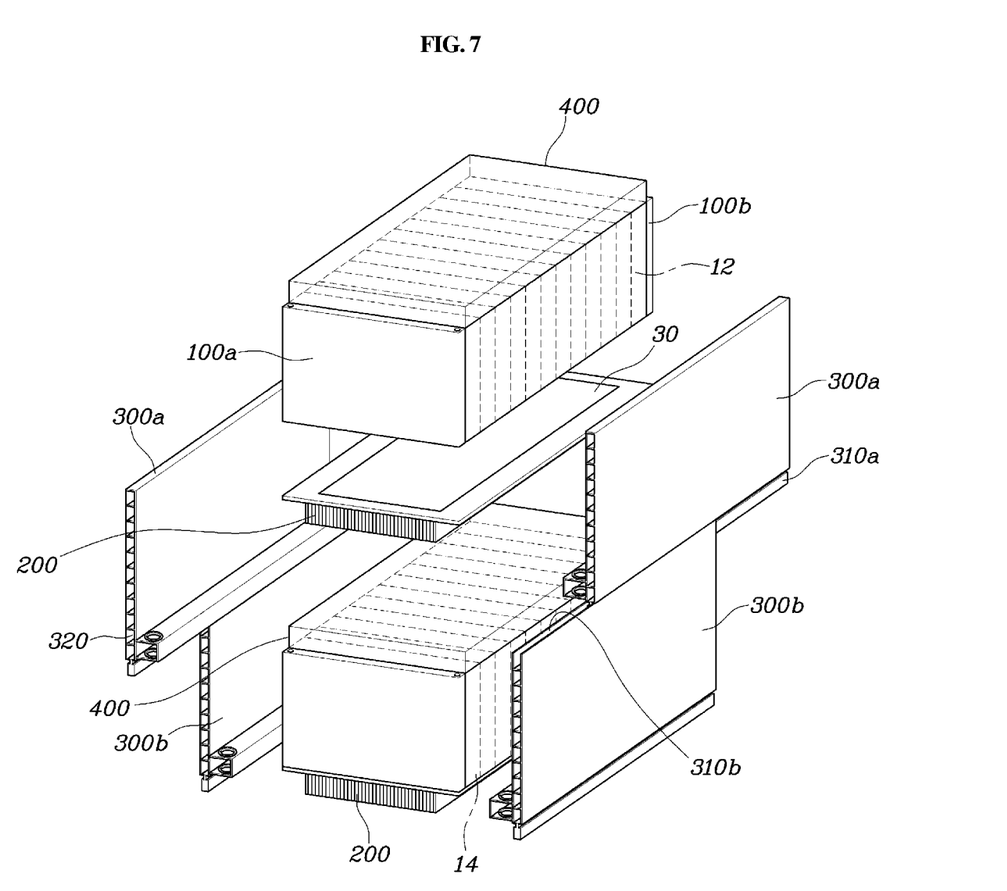
Figure 8:
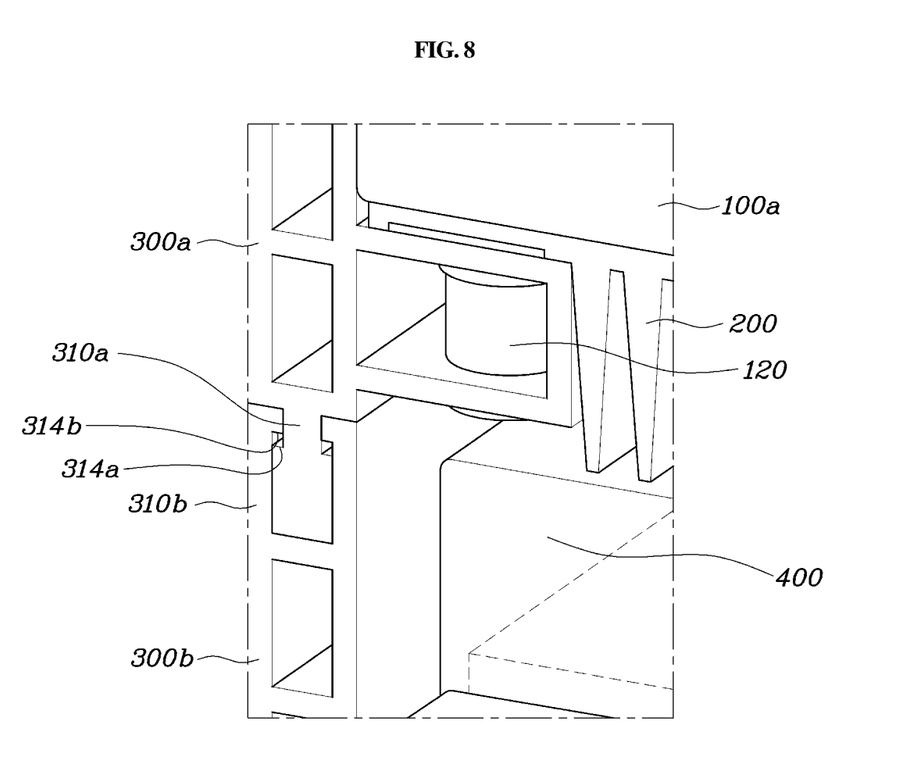
Figure 9:
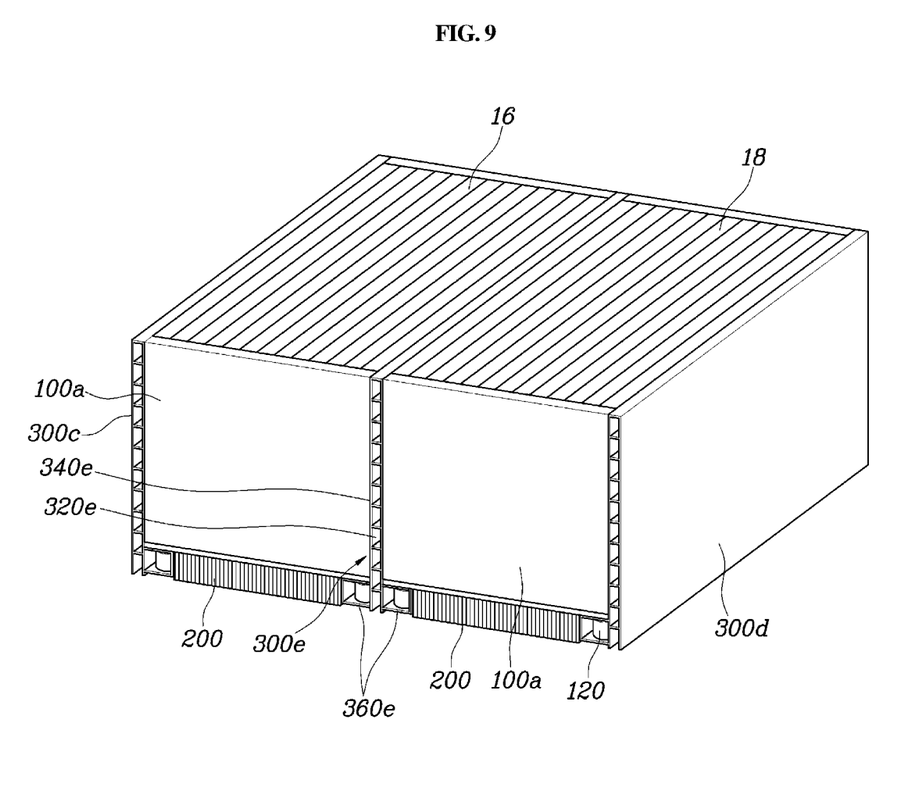
FIG. 9 is a perspective view for describing the battery module of FIG. 1 according to one exemplary embodiment of the present invention.

FIG. 1 is a perspective view illustrating a battery module having a cooling structure according to one exemplary embodiment of the present invention; FIGS. 2 to 4 are perspective views for describing the battery module of FIG. 1; FIG. 5 is a detailed perspective view illustrating a connection structure of a battery module having a cooling structure according to a first exemplary embodiment of the present invention; FIGS. 6 to 8 are views illustrating a connection structure of a battery module having a cooling structure according to a second exemplary embodiment of the present invention; and FIG. 9 is a perspective view for describing the battery module of FIG. 1.

According to the present invention, as illustrated in FIG. 1, a battery module having a cooling structure may include: a front plate 100*a* and a rear plate 100*b* arranged respectively at a front side and a rear side of a battery pack 10 in which a plurality of battery cells is stacked; a heat-dissipating member 200 arranged under the battery pack 10 and configured to absorb heat generated by the battery cells of the battery pack 10; and side plates 300 arranged at lateral ends of the front and rear plates 100*a* and 100*b* and in contact with the heat-dissipating member 200, each side plate 300 including a cooling channel 320 through which a coolant circulates to thus cool the battery pack 10.

In other words, the battery pack 10 may be surrounded by the front plate 100*a*, the rear plate 100*b*, and the side plates 300; the heat-dissipating member 200 that absorbs and then radiates heat may be provided to the bottom surface of the battery pack 10 to dissipate heat generated by the battery pack 10; and the cooling channels 320 through which a coolant circulates may be formed in the side plates 300. Accordingly, the battery pack 10 may be cooled by heat exchange performed between the battery pack 10 and the coolant (e.g., cooling medium).

Further, a plurality of side plates 300 may be provided and may be symmetrically arranged to be coupled to the lateral ends of the front plate 100*a* and the rear plate 100*b*. The coolant may be water or air, determined according to cooling method (water cooling type or air cooling type). The battery pack 10 may be cooled through direct and indirect cooling by the heat-dissipating member 200 and the coolant circulating through the cooling channels formed in the side plates 300, and thus the temperature of the battery pack 100 may be adjusted. Although the cooling structure is provided to the battery pack 10, an overall size of a battery pack is not increased.

Hereinafter, the present invention will be described in greater detail. As illustrated in FIG. 2, battery cells of the battery pack 10 may be stacked to face the side plates 300. When the front plate 100*a* and the rear plate 100*b* are arranged at lateral ends of the opposing side plates 300, coupling members 20 may be screwed from one side of the battery pack 10 to allow the cooling members 20 to pass through one side plate 300 in a thickness direction and then penetrate into the front plate 100*a* or the rear plate 100*b*.

When the battery cells generate electric energy, the battery cells usually expand. Therefore, the battery cells have to be put under an adequate surface contact pressure. According to the present invention, when the battery cells of the battery pack 10 are stacked to face the side plates 300, the front plate 100*a* and the rear plate 100*b* are disposed between end portions of the opposing side plates 300, the coupling members 20 are screwed to extend through the side plate 300 and to penetrate into the front plate 100*a* or to extend through the side plate 300 and to penetrate into the rear plate 100*b*. An example of the coupling member 20 may be a bolt. The coupling member 20 may be screwed though the side plate 300 in a thickness direction (i.e., in a sideways direction of the battery pack 10) to penetrate into the front plate 100*a* or the rear plate 100*b*. Thus, a surface contact pressure may be applied to the battery cells in a direction in which the battery cells are stacked. In this battery module structure, various electrical connectors and sensors may be installed on the front plate 100*a* or the rear plate 100*b*.

Alternatively, as illustrated in FIG. 3, the battery cells may be stacked to face the front plate 100*a* and the rear plate 100*b*. In particular, when the front plate 100*a* and the rear plate 100*b* are arranged at lateral ends of the side plates 300, the coupling members 20 may be screwed into the front plate 100*a* and the rear plate 100*b* from the upper ends of the front plate 100*a* and the rear plate 100*b*. Each coupling member 20 may extend through the front plate 100*a* or the rear plate 100*b* in a vertical direction and may be connected to a lower end portion of the side plate 300.

In other words, when the battery cells of the battery pack 10 are stacked to face the front plate 100*a* and the rear plate 100*b*, when the front plate 100*a* and the rear plate 100*b* are arranged at the lateral ends of the side plates 300, the coupling member 20 may be screwed to extend through the front plate 100*a* or the rear plate 100*b* from the upper end to the lower end, and a lower end portion of the coupling member 20 may be connected to the lower end portion of the side plate 300. The coupling member 20 may be a long bolt to be capable of extending through the plates. As to the side plate 300, the lower end portion thereof may extend toward the battery pack 10 to be in contact with the heat-dissipating member 200 arranged under the battery pack 10. The coupling member 20 may pass through the front plate 100*a* or the rear plate 100*b* from the upper end to the lower end thereof in the vertical direction and the lower end of the coupling member 20 may be connected to the lower end portion of the side plate 300.

Therefore, an adequate surface contact pressure may be applied to the battery cells arranged between the front plate 100*a* and the rear plate 100*b*. In particular, various electrical connectors and sensors may be installed on the side plates 300. However, since the side plates 300 may include a cooling channel through which a coolant circulates, the electrical connectors and sensors may be installed on an upper plate 400 arranged on the top surface of the battery pack 10. In other words, the top surface of the battery pack 10 may include the upper plate 400 that is arranged between the side plates 300 and installed to cover the top surface of the battery pack 10. When electrical connectors and sensors are installed on the upper plate 400, minimal interference occurs with other component parts.

In addition, a heat transfer material 30 may be disposed between the battery pack 10 and the heat-dissipating member 200. With reference to FIGS. 5 and 7, the heat transfer material 30 may be applied to contact surfaces of the battery pack 10 and the heat-dissipating member 200 to facilitate heat exchange between the battery pack 10 and the heat-dissipating member 200. The heat transfer material 30 may be silicone, grease, ceramic, or the like.

Meanwhile, as illustrated in FIGS. 3 to 4, each of the side plates 300 may include: a side heat exchanging portion 340 that abuts a lateral end of the front plate 100*a* and a lateral end of the rear plate 100*b* and may include the cooling channel 320 to perform heat exchange with the battery pack 10; and a support portion 360 bent toward the heat-dissipating member 200 from a lower end of the side heat exchanging portion 340 to be in contact with the heat-dissipating member 200.

As described above, the side plate 300 may include the side heat exchange portion 340 and the support portion 360. An internal space of the side heat exchange portion 340 may include the cooling channel 320. The side heat exchange portion 340 may abut the lateral ends of the front plate 100*a* and the rear plate 100*b* and perform heat exchange with the battery pack 10. The support portion 360 may extend toward the heat-dissipating member 200 from the lower end of the side heat exchange portion 340 such that the support portion 360 is in contact with the heat-dissipating member 200.

In addition, the side heat exchange portion 340 may be connected to the lateral end of the front plate 100*a* and the lateral end of the rear plate 100*b* to enable an adequate surface contact pressure to be applied to the battery cells of the battery pack 10. The support portion 360 is in tight pressure contact the heat-dissipating member 200, that is, the support portion 360 abuts the heat-dissipating member 200. Therefore, all component parts are securely and stably combined with each other. The lower ends of the front plate 100*a* and the rear plate 100*b* may include coupling portions 120 that protrude downward, and the coupling portions 120 pass through the support portions 360 of the side plates 300.

As illustrated in FIG. 3, the side plates 300 may be combined with the front plate 100*a* and the rear plate 100*b* such that the coupling portions extend or protrude downward from the bottom surfaces of the front plate 100*a* and the rear plate 100*b* pass through apertures formed in the support portions 360 of the side plates 300. In other words, the side plates 300 may be combined with the front plate 100*a* and the rear plate 100*b* primarily by the coupling members (bolts), and the combined structure is securely maintained due to the coupling portions 120. The heat-dissipating member 200 may include a wing portion 220, and the wing portion 220 may be interposed between the lower end of the front plate 100*a* and the support portion 360 of the side plate 300 and between the lower end of the rear plate 100*b* and the support portion 360 of the side plate 300. Therefore, when the front and rear plates 100*a* and 100*b* are combined with the side plates 300, the coupling portions 120 may pass through the wing portion 220 of the heat-dissipating member 200 and then penetrate into the support portions 360. Accordingly, the heat-dissipating member 200 may be assembled with the front and rear plates 100a and 100b and with the side plates 300.

Furthermore, as illustrated in FIG. 4, the cooling channel 320 may include a plurality of channels arranged in a vertical direction and each of the channels may extend in a horizontal direction (front-and-rear direction). The size (cross sectional area) of the channel of the cooling channel 320 may gradually increase from the lowest channel to the highest channel. In other words, the cooling channel 320 may include multiple channels that extend in the front-and-rear direction and a coolant may flow along each channel.

Particularly, since the heat-dissipating member 200 is disposed under the battery pack 10, a lower portion of the battery pack 10 may be sufficiently cooled. However, since an upper portion of the battery pack 10 is cooled only by the coolant that circulates through the cooling channels 320 of the side plates 300, cooling efficiency may be reduced at the upper portion of the battery pack 10 compared to the lower portion of the battery pack 10. Accordingly, the size of the channel of the cooling channel 320 may increase toward the upper end of the side plate 300 from the lower end. In other words, a flow rate of the coolant in the channel closer the upper end of the side plate is greater than that in the channel closer the lower end of the side plate. This structure provides increased cooling efficiency for the battery pack.

According to the present invention, even when a plurality of battery packs is assembled in a battery module, the battery module may be assembled in a compact package while having high cooling performance. In a battery module in which a plurality of battery packs is assembled, multiple battery packs (e.g., a first battery pack 12 and a second battery pack 14 of FIG. 5) may be stacked in a vertical direction. Alternatively, in a battery module, multiple battery packs (e.g., a third battery pack 16 and a fourth battery pack 18 of FIG. 9) may be arranged side by side.

As illustrated in FIG. 5, a battery module may include the first battery pack 12 and the second battery pack 14, in which each of the first battery pack 12 and the second battery pack 14 may be assembled with a front plate 100a, a rear plate 100b, and a heat-dissipating member 200 in the same manner that has been described above with reference to the battery pack 10. The first battery pack 12 may be stacked on the second battery pack 14. The number of battery packs staked in the vertical direction to form a battery module is not limited to two but may be more than two. Each of the first battery pack 12 and the second battery pack 14 may be assembled with the front plate 100a, the rear plate 100b, the heat-dissipating member 200, and the side plates 300 in the same manner. The first battery pack 12 and the second battery pack 14 may be combined with each other using the side plates 300.

The side plates assembled with the first battery pack 12 are hereinafter referred to as first side plates 300a. Lower ends of each first side plate 300a may include a first connection portion 310a. The side plates assembled with the second battery pack 14 are hereinafter referred to as second side plates 300b. Upper ends of each second side plate 300b may include a second connection portion 310b. The first connection portion 310a and the second connection portion 310b have complementing structures to be meshed with each other. When the first battery pack 12 is stacked on the second battery pack 14, the first connection portion 310a of the first side plate 300a and the second connection portion 310b of the second side plate 300b may be meshed with each other to combine the upper battery pack and the lower battery pack with each other.

Specifically, FIG. 5 illustrates a first example of a connection structure for connecting the first connection portion 310a to the second connection portion 310b. The first connection portion 310a may include a plurality of protrusions arranged at regular intervals in a longitudinal direction of the first side plate 300a and the second connection portion 310b may include a plurality of recesses arranged at the same intervals as the protrusions in a longitudinal direction of the second side plate 300b. Thus, the first connection portion 310a and the second connection portion 310b may be meshed with each other. In other words, the protrusions of the first connection portion 310a may protrude downward from the lower end of the first side plate 300a, and the recesses of the second connection portion 310b may be recessed from the upper end of the second side plate 300b. Thus, the first connection portion 310a and the second connection portion 310b may be meshed with each other.

In addition, the first connection portion 310a may include a first aperture 312a that extends through the first connection portion 310a in the front-and-rear direction, and the second connection portion 310b may include a second aperture 312b that extends through the second connection portion 310b in the front-and-rear direction. When the first connection portion 310a and the second connection portion 310b are meshed with each other, a fixing member 410 may be inserted sequentially through the first aperture 312a and the second aperture 312b. Accordingly, the first side plate 300a and the second side plate 300b may be connected to with each other by the fixing member 40.

When the first connection portion 310a and the second connection portion 310b are meshed with each other, the first aperture 312a formed in the first connection portion 310a and the second aperture 312b formed in the second connection portion 310b may be arranged in a line (e.g., the apertures are lined up to correspond to each other), thereby forming a straight continuous passage. The fixing member 40 formed as a bar or rod may then be inserted into the passage formed by the first aperture 312a and the second aperture 312b. Thus, the first connection portion 310a and the second connection portion 310b may be connected to each other.

FIG. 6 illustrates a second example of the connection structure for connecting the first connection portion 310a to the second connection portion 310b. As illustrated in FIG. 6, the first connection portion 310a is a protrusion that extends along a longitudinal direction of the first side plate 300a and protrudes downward from the lower end of the first side plate 300a, and may include an engagement protrusion 314a at an end thereof. Additionally, the the second connection portion 310b is a recess that is recessed in the upper end of the second side plate 300b and extends along a longitudinal direction of the second side plate 300b, and may include a guide recess 314b into which the engagement protrusion 314a of the first connection portion 310a may be inserted.

In other words, the first connection portion 310a and the second connection portion 310b may be engaged with each other like a rail. As shown in FIG. 8, since the first connection portion 310a may include an engagement protrusion 314a at an end thereof and the second connection portion 310b may include the guide recess 314b into which the engagement protrusion 314a of the first connection portion 310a may be inserted, the engagement protrusion 314a of the first connection portion 310a may slide in the guide recess 314b of the second connection portion 310b.

Therefore, as illustrated in FIG. 7, the first side plate 300a and the second side plate 300b may be connected to each other in such a manner that the first connection portion 310a of the first side plate 300a is first inserted into the second connection portion 310b of the second side plate 300b and then the first side plate 300a is moved in the front-and-rear direction. Accordingly, the engagement protrusion 314a of the first connection portion 310a slides along the guide recess 314b of the second connection portion 310b, and thus assembling of the first side plate 300a and the second side plate 300b is completed.

As described above, the first side plate 300a and the second side plate 300b may be connected to each other with the use of either the first exemplary connection structure or the second exemplary connection structure. The first battery pack 12 may be assembled with the front plate 100a, the rear plate 100b, and the heat-dissipating member 200, thereby forming a first battery pack assembly. The second battery pack 14 may also be assembled with the front plate 100a, the rear plate 100b, and the heat-dissipating member 200, thereby forming a second battery pack assembly. The first battery pack assembly and the second battery pack assembly are assembled in the same manner. The heat-dissipating member 200 and the first side plate 200a assembled with the first battery pack 12 are stacked on the upper plate 400 and the second side plate 300b assembled with the second battery pack 14. Accordingly, the first and second battery packs 12 and 14 may be assembled with each other in a stacked manner.

Alternatively, as illustrated in FIG. 9, a battery module may include the third battery pack 16 and the fourth battery pack 18 arranged side by side in which each of the third battery pack 16 and the fourth battery pack 18 is assembled with the front plate 100a, the rear plate 100b, and the heat-dissipating member 200 in the same manner that has been described above with reference to the battery pack 10. In other words, the battery pack 10 may be an assembly of the third battery pack 16 arranged on the left side and the fourth battery pack 18 arranged on the right side. The number of battery packs arranged side by side is not limited to two but may be more than two. For the third battery pack 16 and the fourth battery pack 18, the front plate 100a, the rear plate 100b, the heat-dissipating member 200, and the side plates 300 are assembled in the same manner. In particular, the third battery pack 16 and the fourth battery pack 18 may be assembled to each other using the side plate 300 disposed between the third battery pack 16 and the fourth battery pack 18.

Specifically, as illustrated in FIG. 9, a third side plate 300c may be arranged on an outer side surface of the third battery pack 16 and a fourth side plate 300d may be arranged on an outer side surface of the fourth battery pack 18. A center plate 300e may be interposed between the third battery pack 16 and the fourth battery pack 18. In other words, with reference to FIG. 9, the left side surface of the third battery pack 16 may include the third side plate 300c, the right side surface of the fourth battery pack 18 may include the fourth side plate 300d, and the third battery pack 16 and the fourth battery pack 18 may be assembled to each other via one center plate 300e interposed between the third battery pack 16 and the fourth battery pack 18. The third and fourth side plates 300c and 300d may also include a cooling channel 320.

Additionally, the center plate 300e may include: a center heat exchange portion 340e having a center cooling channel 320e to perform heat exchange with the third and fourth battery packs 16 and 18; and a center support portion 360e that is arranged under the center heat exchange portion 340e and extends to be in contact with the heat-dissipating member 200 arranged under the third battery pack 16 and with the heat-dissipating member 200 arranged under the fourth battery pack 18. In other words, the center plate 300e may include the center heat exchange portion 340e and the center support portion 360e; an internal space of the center heat exchange portion 340e may include the center cooling channel 320e such that the center heat exchange portion 340e may perform heat exchange with the third battery pack 16 and the fourth battery pack 18; and the center support portion 360e may support the heat-dissipating member 200 arranged under the third battery pack 16 and the heat-dissipating member 200 arranged under the fourth battery pack 18 as well as the center heat exchange portion 340e, and may press the heat-dissipating members 200 against the battery packs 16 and 18.

By using both the connection manner in which the first and second battery packs 12 and 13 are connected to each other and the connection manner in which the third and fourth battery packs 16 and 18 are connected to each other, it may be possible to provide a battery module in which battery packs are arranged in a matrix with two rows and two columns as illustrated in FIG. 1. The number of battery packs in a battery module may vary according to required energy capacity. The battery module having a cooling structure described above has a reduced size while providing high cooling efficiency. Therefore, the battery module according to the present invention may be assembled in a smaller package than a conventional module.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery module having a cooling structure, comprising:
    a front plate and a rear plate arranged at a front side and a rear side of a battery pack in which a plurality of battery cells is stacked;
    a heat-dissipating member arranged under the battery pack and configured to absorb heat generated by the battery pack; and
    side plates arranged at lateral ends of the front plate and the rear plate, arranged to be in contact with respective lateral ends of the heat-dissipating member, and having a cooling channel through which a coolant circulates to cool the battery pack,
    wherein the battery cells of the battery pack are stacked to face the side plates, the front plate and the rear plate are arranged at lateral ends of the side plates, and the side plates are combined with the front plate and the rear plate in a manner that a coupling member passes through the side plate and penetrates into the front plate in a sideways direction of the battery pack, and a second coupling member passes through the side plate and penetrates into the rear plate in the sideways direction of the battery pack.

2. A battery module having a cooling structure, comprising:
    a front plate and a rear plate arranged at a front side and a rear side of a battery pack in which a plurality of battery cells is stacked;

a heat-dissipating member arranged under the battery pack and configured to absorb heat generated by the battery pack; and side plates arranged at lateral ends of the front plate and the rear plate, arranged to be in contact with respective lateral ends of the heat-dissipating member, and having a cooling channel through which a coolant circulates to cool the battery pack, wherein the battery cells are stacked to face the front plate and the rear plate, the front plate and the rear plate are arranged at lateral ends of the side plates, and the side plates are combined with the front plate and the rear plate in a manner that a coupling member passes through the front plate from an upper end to a lower end of the front plate and is connected to a lower end portion of the side plate at a lower end thereof and a coupling member passes through the rear plate from an upper end to a lower end of the rear plate and is connected to a lower end portion of the side plate at a lower end thereof.

3. The battery module according to claim 1, wherein a heat transfer material is disposed between the battery pack and the heat-dissipating member.

4. The battery module according to claim 1, wherein each of the side plates includes:
   a side heat exchange portion arranged at the lateral ends of the front plate and the rear plate and having a cooling channel to perform heat exchange with the battery pack; and
   a support portion bent from a lower end portion of the side heat exchange portion and extending to an underside of the front plate or the rear plate to be in contact with the heat-dissipating member.

5. The battery module according to claim 4, wherein coupling portions are formed to protrude downward from the lower ends of the front plate and the rear plate, and the coupling portions pass through the support portions of the side plates.

6. The battery module according to claim 1, wherein the cooling channel of the side plate extends in a front-and-rear direction and includes a plurality of channels arranged in a vertical direction.

7. The battery module according to claim 6, wherein a size of the channels of the cooling channel gradually increases from a lowest channel of the channels to a highest channel of the channels.

8. The battery module according to claim 1, further comprising:
   an upper plate arranged on a top surface of the battery pack and between the side plates to cover the top surface of the battery pack.

9. The battery module according to claim 1,
wherein the battery pack includes a first battery pack and a second battery pack that are stacked in a vertical direction and each of which is assembled with a front plate, a rear plate, side plates, and a heat-dissipating member, and
wherein a first side plate provided to the first battery pack includes a first connection portion at a lower end thereof, a second side plate provided to the second battery pack includes a second connection portion at an upper end thereof, and the first connection portion and the second connection portion are connected to each other.

10. The battery module according to claim 9,
wherein the first connection portion includes a plurality of protrusions that extends downward from the lower end of the first side plate and is arranged in a longitudinal direction of the first side plate at regular intervals, and
wherein the second connection portion includes a plurality of recesses recessed from the upper end of the second side plate and arranged in a longitudinal direction of the second plate at the same intervals as the protrusions of the first connection portion, the second connection portion being meshed with the first connection portion.

11. The battery module according to claim 10,
wherein the first connection portion includes a first aperture that extends in a front-and-rear direction of the battery module,
wherein the second connection portion includes a second aperture that extends in the front-and-rear direction of the battery module, and
wherein the first side plate and the second side plate are combined with each other by a fixing member inserted through the first aperture and the second aperture when the first connection portion and the second connection portion are meshed with each other.

12. The battery module according to claim 9,
wherein the first connection portion is a protrusion that extends in a longitudinal direction of the first side plate and protrudes downward from the lower end of the first side plate and includes an engagement protrusion at an end of the protrusion, and
wherein the second connection portion is a recess that is recessed in the upper end of the second side plate and extends in a longitudinal direction of the second side plate and includes a guide recess into the engagement protrusion is inserted.

13. The battery module according to claim 1,
wherein the battery pack includes a third battery pack and a fourth battery pack that are arranged side by side and each of which is assembled with a front plate, a rear plate, and a heat-dissipating member, and
wherein a third side plate is arranged on an outer side surface of the third battery pack, a fourth side plate is arranged on an outer side surface of the fourth battery pack, and a center plate is interposed between the third battery pack and the fourth battery pack.

14. The battery module according to claim 13, wherein the center plate includes:
   a center heat exchange portion having a center cooling channel to perform heat exchange with the third and fourth battery packs; and
   a center support portion that extends from a lower portion of the center heat exchange portion to be in contact with the heat-dissipating member provided to the third battery pack and with the heat-dissipating member provided to the fourth battery pack.

* * * * *